United States Patent
Lee et al.

(10) Patent No.: US 8,286,094 B2
(45) Date of Patent: Oct. 9, 2012

(54) APPARATUS AND METHOD FOR PRINTING FILE USING TOOLBAR BUTTON

(75) Inventors: Seung-wan Lee, Suwon-si (KR); Chung-a Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 11/475,884

(22) Filed: Jun. 28, 2006

(65) Prior Publication Data

US 2007/0006090 A1  Jan. 4, 2007

(30) Foreign Application Priority Data

Jun. 29, 2005  (KR) .................. 10-2005-0056936

(51) Int. Cl.
  *G06F 3/00*  (2006.01)
  *G06F 3/048*  (2006.01)
(52) U.S. Cl. ........ 715/826; 715/762; 715/763; 715/810; 715/843
(58) Field of Classification Search .......... 715/779, 715/840–841, 842–843, 826, 762–763, 810–825, 715/827–839, 844, 845
See application file for complete search history.

(56) References Cited

U.S. PATENT DOCUMENTS

| | | | | |
|---|---|---|---|---|
| 5,079,723 A * | 1/1992 | Herceg et al. | ................. | 715/810 |
| 5,345,550 A * | 9/1994 | Bloomfield | .................... | 715/841 |
| 5,530,796 A * | 6/1996 | Wang | ............................ | 715/762 |
| 5,559,948 A * | 9/1996 | Bloomfield et al. | .......... | 715/835 |
| 5,644,737 A * | 7/1997 | Tuniman et al. | ............... | 715/810 |
| 5,659,693 A * | 8/1997 | Hansen et al. | ................. | 715/779 |
| 5,699,495 A * | 12/1997 | Snipp | ............................ | 358/1.15 |
| 5,717,439 A * | 2/1998 | Levine et al. | ................. | 715/835 |
| 5,760,775 A * | 6/1998 | Sklut et al. | .................... | 715/839 |
| 5,760,776 A * | 6/1998 | McGurrin et al. | ............ | 715/841 |
| 5,784,583 A * | 7/1998 | Redpath | ........................ | 715/841 |
| 5,828,376 A * | 10/1998 | Solimene et al. | ............. | 715/821 |
| 5,872,568 A * | 2/1999 | Alimpich et al. | ............. | 715/835 |
| 5,940,078 A * | 8/1999 | Nagarajayya et al. | ........ | 715/859 |
| 5,982,367 A * | 11/1999 | Alimpich et al. | ............. | 715/810 |
| 5,996,029 A * | 11/1999 | Sugiyama et al. | ............. | 710/15 |
| 6,076,080 A * | 6/2000 | Morscheck et al. | .......... | 705/400 |
| 6,100,885 A * | 8/2000 | Donnelly et al. | ............. | 715/762 |
| 6,104,470 A * | 8/2000 | Streefkerk et al. | .............. | 355/40 |
| 6,133,915 A * | 10/2000 | Arcuri et al. | ................... | 715/779 |
| 6,148,346 A * | 11/2000 | Hanson | ......................... | 719/321 |
| 6,232,968 B1 * | 5/2001 | Alimpich et al. | ............. | 715/744 |

(Continued)

FOREIGN PATENT DOCUMENTS

JP  2000-108460  4/2000

(Continued)

*Primary Examiner* — Mark Rinehart
*Assistant Examiner* — William Wong
(74) *Attorney, Agent, or Firm* — Roylance, Abrams, Berdo & Goodman, LLP

(57) ABSTRACT

An apparatus and method for printing by using a toolbar button is provided. The apparatus includes a user interface for receiving printing options to be selected by using the toolbar button, and a controller for creating the toolbar button to allow a user to print the file based on a selected printing option and inserting the created toolbar button into a host application. Accordingly, the user can print the file by setting a desired printer and printing option by using the toolbar button without using an additional user interface.

14 Claims, 4 Drawing Sheets

U.S. PATENT DOCUMENTS

| | | | |
|---|---|---|---|
| 6,344,859 B1* | 2/2002 | Alimpich et al. | 715/762 |
| 6,384,849 B1* | 5/2002 | Morcos et al. | 715/810 |
| 6,456,304 B1* | 9/2002 | Angiulo et al. | 715/779 |
| 6,542,173 B1* | 4/2003 | Buckley | 715/841 |
| 6,556,875 B1* | 4/2003 | Nagasaka et al. | 700/19 |
| 6,599,244 B1* | 7/2003 | Epps et al. | 600/437 |
| 6,621,532 B1* | 9/2003 | Mandt | 348/841 |
| 6,686,938 B1* | 2/2004 | Jobs et al. | 715/835 |
| 6,704,033 B2* | 3/2004 | Moore et al. | 715/777 |
| 6,707,568 B1* | 3/2004 | Yu | 358/1.15 |
| 6,727,919 B1* | 4/2004 | Reder et al. | 715/810 |
| 6,762,771 B1* | 7/2004 | Niki et al. | 715/700 |
| 6,888,643 B1* | 5/2005 | Grimes | 358/1.15 |
| 6,962,449 B2* | 11/2005 | Lermant et al. | 400/76 |
| 6,967,728 B1* | 11/2005 | Vidyanand | 358/1.12 |
| 7,036,087 B1* | 4/2006 | Odom | 715/779 |
| 7,081,969 B1* | 7/2006 | Motamed et al. | 358/1.16 |
| 7,301,662 B2* | 11/2007 | Mifune | 358/1.15 |
| 2001/0053978 A1* | 12/2001 | Lewis et al. | 704/275 |
| 2002/0070977 A1* | 6/2002 | Morcos et al. | 345/810 |
| 2002/0093529 A1* | 7/2002 | Daoud et al. | 345/745 |
| 2002/0120742 A1* | 8/2002 | Cherry | 709/226 |
| 2002/0131065 A1* | 9/2002 | Sweetland et al. | 358/1.13 |
| 2002/0181013 A1* | 12/2002 | Dunlap | 358/1.15 |
| 2002/0198904 A1* | 12/2002 | Robles et al. | 707/500 |
| 2003/0002077 A1* | 1/2003 | Shima | 358/1.15 |
| 2003/0011801 A1* | 1/2003 | Simpson et al. | 358/1.13 |
| 2003/0014446 A1* | 1/2003 | Simpson et al. | 707/527 |
| 2003/0030664 A1* | 2/2003 | Parry | 345/744 |
| 2003/0046268 A1* | 3/2003 | Hirabayashi | 707/1 |
| 2003/0066027 A1* | 4/2003 | Nakagiri | 715/500 |
| 2003/0079030 A1* | 4/2003 | Cocotis et al. | 709/229 |
| 2003/0080988 A1* | 5/2003 | Moran et al. | 345/705 |
| 2003/0103235 A1* | 6/2003 | Gomi | 358/1.15 |
| 2003/0107606 A1* | 6/2003 | Capps et al. | 345/810 |
| 2003/0122868 A1* | 7/2003 | Aggarwal et al. | 345/760 |
| 2003/0197883 A1* | 10/2003 | Lay et al. | 358/1.13 |
| 2004/0001215 A1* | 1/2004 | Kurotsu | 358/1.13 |
| 2004/0012802 A1* | 1/2004 | Allen et al. | 358/1.13 |
| 2004/0021647 A1* | 2/2004 | Iwema et al. | 345/179 |
| 2004/0036720 A1* | 2/2004 | Dworsky | 345/764 |
| 2004/0061720 A1* | 4/2004 | Weber | 345/760 |
| 2004/0150673 A1* | 8/2004 | Dobronsky | 345/810 |
| 2004/0163049 A1* | 8/2004 | Mori et al. | 715/527 |
| 2004/0184069 A1* | 9/2004 | Mifune | 358/1.15 |
| 2004/0185877 A1* | 9/2004 | Asthana et al. | 455/456.6 |
| 2004/0246511 A1* | 12/2004 | Wong et al. | 358/1.13 |
| 2005/0002063 A1* | 1/2005 | Hanamoto | 358/1.18 |
| 2005/0050448 A1* | 3/2005 | Dehart | 715/501.1 |
| 2005/0086282 A1* | 4/2005 | Anderson et al. | 709/200 |
| 2005/0134891 A1* | 6/2005 | Ishizaki | 358/1.13 |
| 2005/0154998 A1* | 7/2005 | Mathieson | 715/809 |
| 2005/0165827 A1* | 7/2005 | Schmitt | 707/102 |
| 2005/0204293 A1* | 9/2005 | Raghunathan et al. | 715/739 |
| 2005/0248800 A1* | 11/2005 | Choi | 358/1.13 |
| 2005/0251755 A1* | 11/2005 | Mullins et al. | 715/779 |
| 2006/0026600 A1* | 2/2006 | Yoshida | 719/310 |
| 2006/0028668 A1* | 2/2006 | Kumashio | 358/1.13 |
| 2006/0036946 A1* | 2/2006 | Radtke et al. | 715/711 |
| 2006/0107217 A1* | 5/2006 | Lu et al. | 715/733 |
| 2006/0285141 A1* | 12/2006 | Kim et al. | 358/1.13 |
| 2006/0285868 A1* | 12/2006 | Holmes | 399/81 |
| 2007/0089065 A1* | 4/2007 | Lane et al. | 715/764 |
| 2007/0139662 A1* | 6/2007 | Eom et al. | 358/1.1 |

FOREIGN PATENT DOCUMENTS

| | | |
|---|---|---|
| JP | 2001-290630 | 10/2001 |
| JP | 2003-316536 | 11/2003 |

* cited by examiner

US 8,286,094 B2

APPARATUS AND METHOD FOR PRINTING FILE USING TOOLBAR BUTTON

CROSS-REFERENCE TO RELATED APPLICATION

This application claims the benefit under 35 U.S.C. §119(a) of a Korean patent application No. 10-2005-0056936, filed on Jun. 29, 2005, in the Korean Intellectual Property Office, the entire disclosure of which is hereby incorporated by reference.

BACKGROUND OF THE INVENTION

1. Field of the Invention

The present invention relates to an apparatus and method for printing a file using a toolbar button. More particularly, the present invention relates to an apparatus and method for printing a file, by allowing a user to make a toolbar button for selecting a printer and printing options and printing the file by using the created toolbar button.

2. Description of the Related Art

FIG. 1 is a diagram illustrating a method of printing a file by using a conventional toolbar button in a host application.

Referring to FIG. 1, for user convenience, the host application comprises toolbar buttons used for directly selecting functions, which are frequently used, without searching a menu. A printing toolbar button 100 represents a toolbar button used for printing a file in MS-Word.

When the user wants to print a file, the user activates a host application related to the file. The host application forms an application form including toolbar buttons, such as the printing toolbar button 100, by loading resources set therein, such as menus, caption functions, icons, and toolbar buttons.

When the user wants to print the file, in step 110, the user selects the printing toolbar button 100 among the toolbar buttons. When the host application detects that the user has clicked the printing toolbar button 100 among the toolbar buttons, in step 120, the host application calls a default printer driver by using a Windows® Graphic Device Interface (GDI) command. In step 130, the called printer driver generates an emulation command for a printing task in a printer and transmits the generated emulation command to the printer.

Most of host applications provide a toolbar so that a user can quickly and conveniently select frequently used functions, for instance, new file creation, file open, file storage, and file printing functions. A printing toolbar button for printing a file is generally provided in such a toolbar. However, since only a default printer among printers that the host can use at that moment is simply set to the printing toolbar button, it is not possible for a user to print the file by selecting another printer through the printing toolbar button.

In addition, since a printing task is activated as soon as the printing toolbar button is clicked, the user cannot know in advance the printing options set to a printer for performing the printing task and can know such options only after printing the file. Thus, if the user wants to set a printing option to a printer and print a file by using the printer, the user cannot use a printing toolbar button even if the printing toolbar button exists in a host application, and can print the file only after he/she opens a user interface for setting a printing environment and sets the printing option to the printer.

Accordingly, there is a need for an improved apparatus and method for setting a printing option and for selecting a printer through a printing toolbar button.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for printing a file, using a toolbar button by allowing a user to make a toolbar button for selecting a printer and printing options and printing the file by using the created toolbar button without using an additional user interface.

According to an aspect of the present invention, an apparatus for printing a file by using a toolbar button is provided. The apparatus comprises a first user interface for receiving printing options to be selected by using the toolbar button, and a controller for creating the toolbar button to allow a user to print the file based on a selected printing option and inserting the created toolbar button into a host application.

The apparatus may further comprise a second user interface for receiving available printers to be selected by using the toolbar button, and the controller creates the toolbar button based on a printing option selected from among the printing options of a printer selected from among the available printers.

The first user interface may comprise a display box for displaying the available printers, at least one push button for adding a printer selected from among the available printers displayed in the display box in a display portion or deleting a selected printer from the display portion, and the display portion for displaying finally added printers.

The second user interface may comprise a display box for displaying the printing options, at least one push button for adding a printing option from among the printing options displayed in the display box in a display portion or deleting a selected printing option from the display portion, and the display portion for displaying the finally added printing options.

The controller may control the host application to store the selected and added/deleted printers and printing options in a file or registry.

The apparatus may further comprise a driver core for printing the file created in the host application.

If a desired printer and a desired printing option are selected from the inserted toolbar button, the controller may control the driver core to print the file using the selected printing option in the selected printer.

The first or second user interface and the controller may operate in a printer driver or a host application.

The controller may detect an application message when the host application operates and insert the created toolbar button into the host application if the detected message relates to a toolbar button.

The controller may activate the inserted toolbar button by using a drop down list or an icon list.

According to another aspect of the present invention, a method of printing a file by using a toolbar button is provided. The method comprises receiving available printers to be selected by using the toolbar button, receiving printing options to be selected by using the toolbar button, creating the toolbar button allowing a user to print the file based on a printing option selected from among the printing options of a printer selected from among the available printers, and inserting the created toolbar button into a host application.

The method may further comprise printing the file by using the inserted toolbar button.

In the receiving of the available printers, the available printers or the printing options may be displayed in a display box.

In the receiving of the available printers, a selected printer from among the available printers displayed in the display box or a selected printing option from among the printing options displayed in the display box may be added in a display portion using at least one push button, or a selected printer or a selected printing option may be deleted from the display portion using the at least one push button.

In the receiving of the available printers, the finally added printers or printing options may be displayed in the display portion.

The inserting may comprise detecting an application message when the host application operates, inserting the created toolbar button into the host application if the detected message relates to a toolbar button, and activating the inserted toolbar button.

In the activation, the inserted toolbar button may be activated by using a drop down list or an icon list.

The method may further comprise if a printer and a printing option to be used for printing the file are selected from the drop down list or the icon list, printing the file based on the selected option in the selected printer.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. An apparatus and method for printing a file using a toolbar button according to exemplary embodiments of the present invention will now be described more fully with reference to the accompanying drawings.

Figure 1:
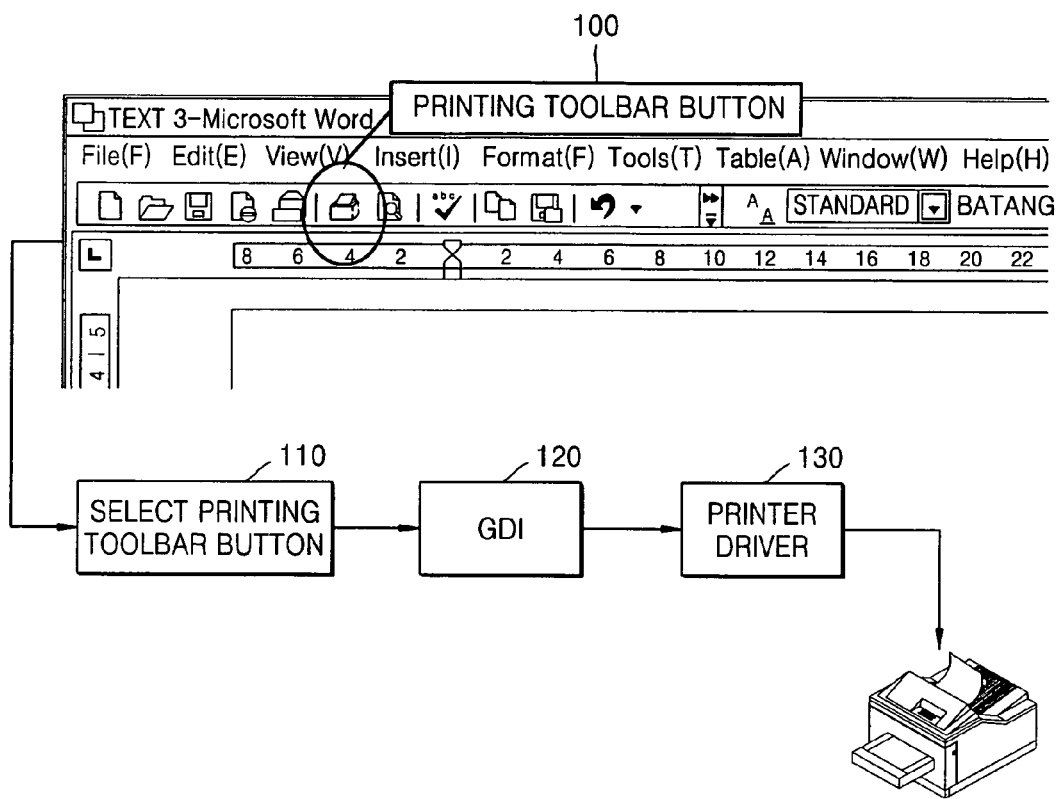
FIG. 1 is a diagram illustrating a method of printing a file by using a conventional toolbar button in a host application.
Figure 2:
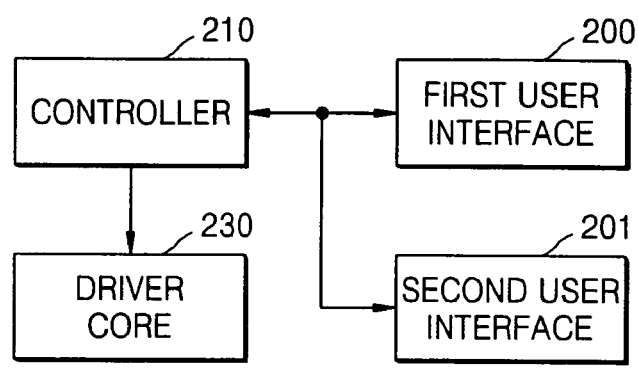
FIG. 2 is a block diagram illustrating an apparatus for printing a file by using a toolbar button according to an exemplary embodiment of the present invention.

FIG. 2 is a block diagram illustrating an apparatus for printing a file by using a toolbar button according to an exemplary embodiment of the present invention. Referring to FIG. 2, the apparatus comprises a first user interface 200, a second user interface 201, a controller 210, and a driver core 230.

Printers to be selected by using the toolbar button are received by using the first user interface 200. Printer names, manufacturers or user settings, and model names can be displayed on a printer selection screen of the first user interface 200.

Printing options to be selected by using the toolbar button are received by using the second user interface 201. The first user interface 200 and the second user interface 201 can be implemented with a single interface.

Both the first user interface 200 and the second user interface 201 can be included in the apparatus, or one of them can be selectively included in the apparatus.

Figure 3:
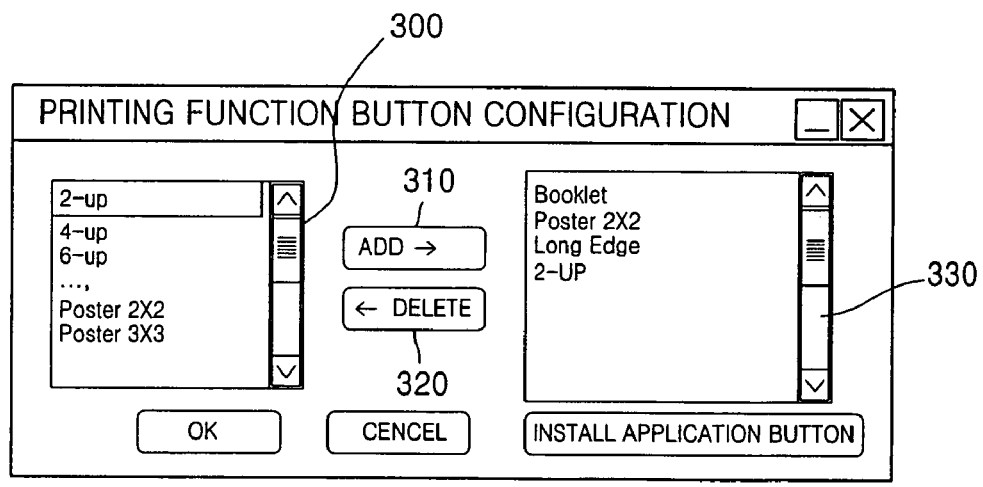
FIG. 3 is a diagram illustrating addition and deletion of a printing function into and from printing functions to be selected by using a toolbar button through a user interface according to an exemplary embodiment of the present invention.

FIG. 3 is a diagram illustrating a second user interface 201 according to an exemplary embodiment of the present invention. Referring to FIG. 3, the second user interface 201 comprises a display box 300, an add button 310, a delete button 320, and a display portion 330.

The display box 300 displays printing options provided by the apparatus.

The add button 310 is used to add a selected printing option from among the printing options displayed in the display box 300 in the display portion 330, and the delete button 320 is used to delete a selected printing option from the display portion 330.

The display portion 330 displays the finally added printing options. Any printing option added by using the add button 310 and displayed in the display portion 330 can also be deleted from the display portion 330 using the delete button 320.

The controller 210 creates the toolbar button for allowing a user to print a file based on a selected printing option of a selected printer and inserts the created toolbar button into a host application.

Figure 4A:
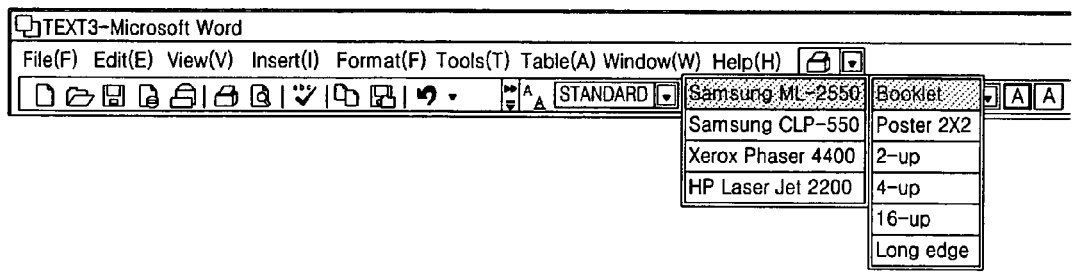
FIGS. 4A through 4C are diagrams illustrating a case where a toolbar button is inserted and activated by using a drop down list according to exemplary embodiments of the present invention.
Figure 4B:
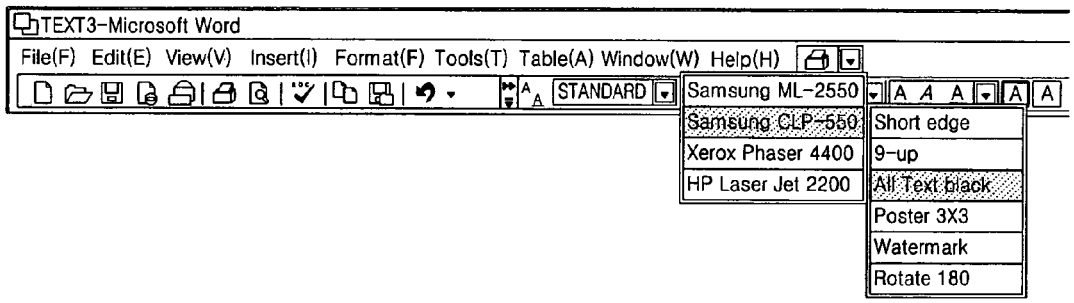
Figure 4C:
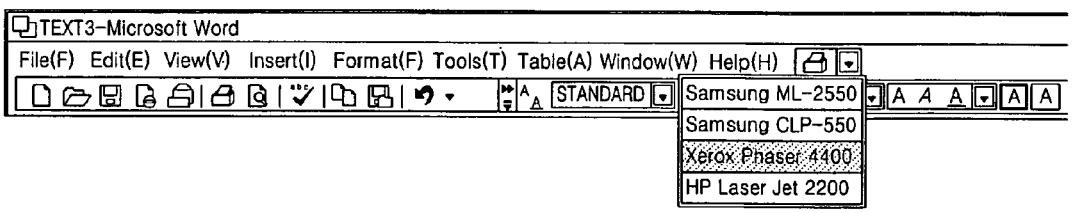

FIGS. 4A through 4C are diagrams illustrating a case where the toolbar button is inserted and activated by using a drop down list according to exemplary embodiments of the present invention.

Figure 5:
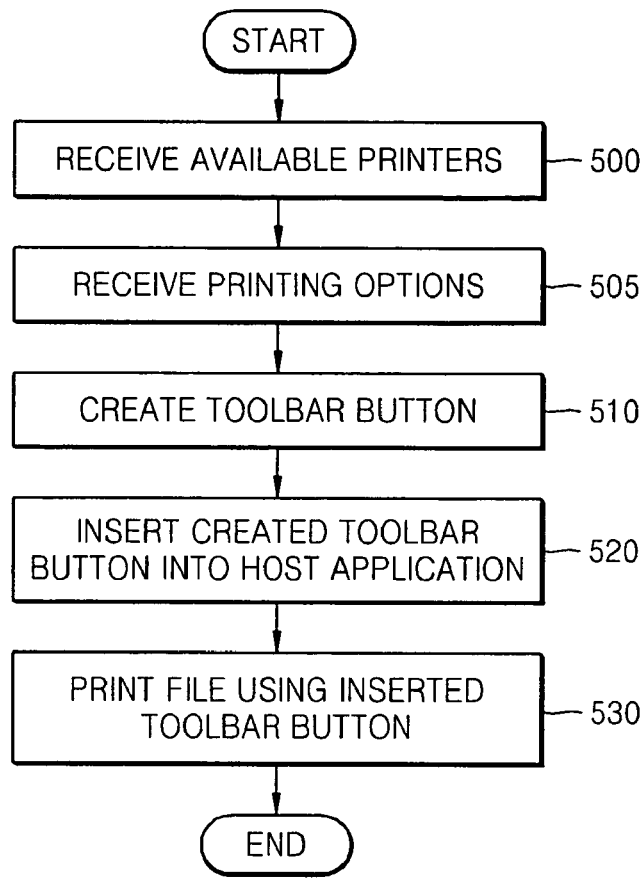
FIG. 5 is a flowchart illustrating a method of printing a file by using a toolbar button according to an exemplary embodiment of the present invention.

Referring to FIGS. 4A through 4C, the controller 210 detects an application message when the host application operates, and if the detected message relates to a toolbar button, the controller 210 inserts the created toolbar button into the host application as illustrated in FIG. 5.

A method of inserting a toolbar button into an application as described above is called hooking. A general host application has a unique number, which is a process ID, for example, a handle. In addition, the host application uses a common Windows® message in an operation thereof. Thus, the controller 210 determines a toolbar message for inserting a toolbar button into the host application among Windows® messages created with a handle of the host application. If a toolbar message for the host application is detected, the controller 210 inserts a created toolbar button into an appropriate location by obtaining Windows® information.

The controller 210 activates the inserted toolbar button by using a drop down list or an icon list. For example, to activate the toolbar button inserted into the host application, a TB_GETSTATE message is used.

By selecting the toolbar button inserted into the host application, a drop down list is activated, and the user can print a file by selecting a desired printer and printing option from the drop down list. Referring to FIG. 4A, when the toolbar button is clicked, printer drivers installed in a relevant host are shown, and if the user selects a driver such as Samsung® ML-2500 which is supported, according to an exemplary embodiment of the present invention, printing options to be selected are shown, and a Booklet option from among the printing options is selected.

Referring to FIG. 4B, if the user selects another driver such as Samsung® CLP-550 which is supported, according to an exemplary embodiment of the present invention, printing options to be selected for the driver are shown, and the user selects an All Text black option.

Referring to FIG. 4C, drivers which are not supported, according to an exemplary embodiment of the present invention, which are installed in the host, are also shown, and one of them can be selected and used for printing the file.

The controller 210 controls the host application to store the selected and added/deleted printers and printing options in a file or registry.

The driver core 230 prints a file created by using the host application. The driver core 230 is installed in the selected printer driver and generates an emulation command for allowing an emulation to be performed in the selected printer according to the selected printing option. Here, the driver core 230 prints the file by reading the selected printing option from the drop down list of the toolbar button and setting "Devmode" used to determine an option in the printer driver to the selected printing option.

When a desired printer and a desired printing option are selected from the inserted toolbar button, the controller 210 controls the driver core 230 to print the file by using the selected printing option in the selected printer.

In an exemplary implementation, the first user interface 200 and the controller 210 operate in a printer driver or a host application.

FIG. 5 is a flowchart illustrating a method of printing a file by using a toolbar button according to an exemplary embodiment of the present invention. The method of printing a file by using a toolbar button will now be described by referring to FIG. 2.

Referring to FIGS. 2 and 5, in step 500, printers are received by using the first user interface 200. In step 505, printing options are received by using the second user interface 201. Here, desired printers and desired printing options are determined from the display box 300, and printers and printing options to be added in a drop down list of a toolbar button using push buttons such as the add button 310 and the delete button 320.

After the printers and printing options are received using the first and second user interfaces 200 and 201, in step 510, the controller 210 creates the toolbar button allowing a user to print a file based on a selected printing option in a selected printer.

Figure 6:
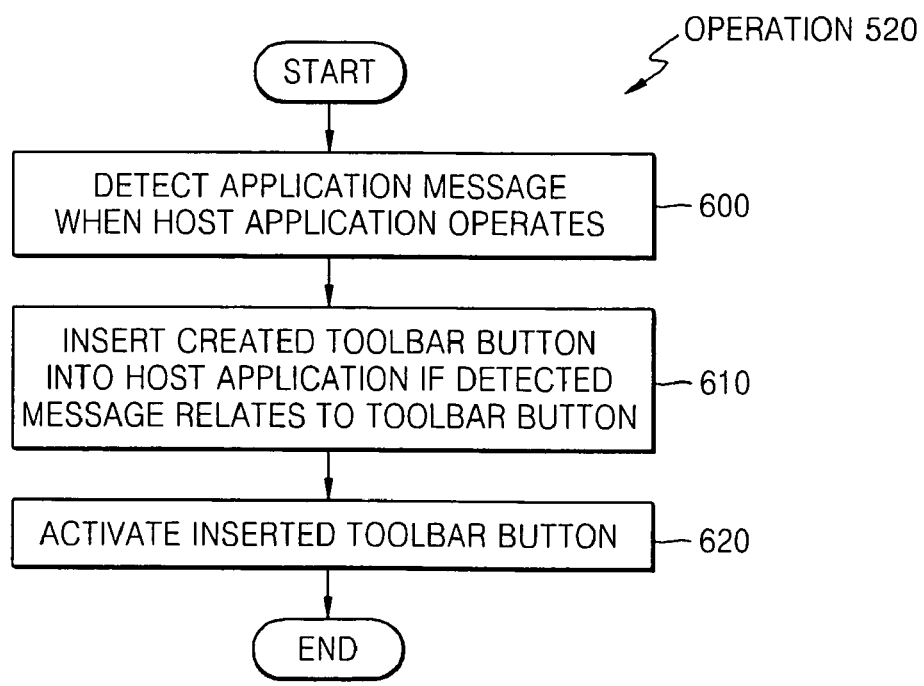
FIG. 6 is a detailed flowchart illustrating step 520 illustrated in FIG. 5 according to an exemplary embodiment of the present invention.

When a host application operates, in step 520, the controller 210 inserts the created toolbar button into the host application. FIG. 6 is a detailed flowchart of step 520 illustrated in FIG. 5 according to an exemplary embodiment of the present invention.

Referring to FIG. 6, when the host application operates, in step 600, the controller 210 detects an application message. In step 610, the created toolbar button is inserted into the host application if the detected message relates to a toolbar button. In step 620, the controller 210 activates the inserted toolbar button. Here, the inserted toolbar button is activated by using a drop down list or an icon list.

In step 530, when the drop down list or icon list appears by clicking the inserted toolbar button, the user prints the file by selecting a desired printer and a desired printing option from the drop down list or icon list.

An exemplary embodiment of the present invention may be embodied in a general-purpose computer by running a program from a computer-readable medium, including but not limited to storage media such as magnetic storage media (ROMs, floppy disks, hard disks, and the like), optically readable media (CD-ROMs, DVDs, and the like).

As described above, according to exemplary embodiments of the present invention, by receiving printers and printing options to be selected by using a toolbar button and creating the toolbar button for allowing a user to print a file by using a selected printing option of a selected printer, the user can print the file by setting a desired printer and printing option using the toolbar button without using an additional user interface.

While the present invention has been particularly shown and described with reference to exemplary embodiments thereof, it will be understood by those of ordinary skill in the art that various changes in form and detail may be made therein without departing from the spirit and scope of the present invention as defined by the following claims and the equivalents.

What is claimed is:

1. A general purpose computer comprising a non-transitory computer readable medium including instructions for printing a file by using a toolbar button whose selection causes an invocation of a printing function, the general purpose computer comprising:
a first user interface to receive information on a subset of printers selected by a user from among a set of available printers,
wherein the information on the subset of printers is listed via a graphical user interface (GUI) control activated by a selection of the toolbar button so as to allow the user to select a printer from among the subset of the printers for printing when the selection of the toolbar button is on-going;
a second user interface to receive, for the printer from among the subset of printers, information on a subset of printing options selected by the user from among a set of available options corresponding to the printer,
wherein the second user interface comprises: a display box to display information on the set of available options corresponding to the printer from among the subset of printers; a display portion to display the subset of printing options corresponding to the printer; and at least one push button to add a printing option from among the set of available options to the subset of printing options corresponding to the printer or to delete a printing option selected from the subset of printing options, wherein the display portion is configured for displaying the added printing option, and
wherein, when the printer is being selected by the user via the GUI control during the on-going selection of the toolbar button, the on-going selection of the printer causes listing the information on the subset of printing options together with the information on the subset of printers via the GUI control so as to allow the user to select at least one printing option from among the subset of printing options; and
a controller to create the toolbar button and to insert the created toolbar button into a host application,
wherein, when the user, through selecting the toolbar button, selects the printer from among the subset of printers via the GUI control and selects at least one printing option from among the subset of printing options corresponding to the selected printer via the GUI control, the controller causes performing the printing function by the selected printer based on the selected at least one printing option.

2. The general purpose computer of claim 1, wherein the first user interface comprises: a display box to display information on the set of available printers; a display portion to display the information on the subset of printers; and at least one push button to add a printer from among the set of the available printers to the subset of printers or to delete a printer selected from the subset of printers, wherein the display portion is configured for displaying the added printer.

3. The general purpose computer of claim 1, wherein the second user interface comprises:
- a display box to display the information on the set of available options corresponding to the printer from among the subset of printers;
- a display portion to display the printing options corresponding to the printer; and
- at least one push button to add a printing option from among the set of available options to the subset of printing options corresponding to the printer or to delete a printing option selected from the subset of printing options;
- wherein the display portion is configured for displaying the added printing option.

4. The general purpose computer of claim 3, wherein the controller controls the host application to store at least one of an added printer, a deleted printer and printing options in a file or registry.

5. The general purpose computer of claim 1, further comprising a driver core for printing the file created in the host application.

6. The general purpose computer of claim 5, wherein if the printer and the at least one printing option are selected from the inserted toolbar button, the controller controls the driver core to print the file by using the selected printer based on the selected at least one printing option.

7. The general purpose computer of claim 1, wherein at least one of the first user interface, the second user interface and the controller operate in a printer driver or a host application.

8. The general purpose computer of claim 1, wherein the controller detects an application message when the host application operates and inserts the created toolbar button into the host application if the detected message relates to the toolbar button.

9. The general purpose computer of claim 8, wherein the controller activates the inserted toolbar button by using a drop down list or an icon list.

10. A method of printing a file by using a toolbar button whose selection causes an invocation of a printing function, the method comprising:
- receiving information on a subset of printers selected by a user from among a set of available printers,
- wherein the information on the subset of printers is listed via a graphical user interface (GUI) control activated by a selection of the toolbar button so as to allow the user to select a printer from among the subset of the printers for printing when the selection of the toolbar button is on-going;
- receiving information on a subset of printing options selected by the user from among a set of available options associated with the printer from among the subset of printers,
- wherein said receiving information on the subset of printing options further comprises: performing at least one of adding a printing option to a display portion and deleting a printing option from the display portion, using at least one push button; and displaying the subset of printing options in the display portion, and
- wherein, when the printer is being selected by the user via the GUI control during the on-going selection of the toolbar button, the on-going selection of the printer causes listing the information on the subset of printing options together with the information on the subset of printers via the GUI control so as to allow the user to select at least one printing option from among the subset of printing options;
- creating the toolbar button;
- inserting the toolbar button into a host application;
- selecting the toolbar button; and
- selecting a printer from among the subset of printers via the GUI control and selecting at least one printing option from among the subset of printing options corresponding to the selected printer via the GUI control to cause generating a command to perform a printing function using the selected printer based on the selected at least one printing option.

11. The method of claim 10, further comprising:
- performing at least one of adding a printing option to a display portion and deleting a printing option from the display portion, using at least one push button; and
- displaying the subset of printing options in the display portion.

12. The method of claim 10, wherein said receiving information on the subset of printers further comprises: performing at least one of adding a printer to a display portion and deleting a printer from the display portion, using at least one push button; and displaying the subset of printers in the display portion.

13. The method of claim 10, wherein the inserting of the created toolbar button comprises:
- detecting an application message when the host application operates;
- inserting the toolbar button into the host application if the detected message relates to the toolbar button; and
- activating the inserted toolbar button.

14. The method of claim 13, wherein the activating comprises activating the inserted toolbar button by using a drop down list or an icon list.

* * * * *